(12) United States Patent
Hassan et al.

(10) Patent No.: US 7,730,085 B2
(45) Date of Patent: Jun. 1, 2010

(54) METHOD AND SYSTEM FOR EXTRACTING AND VISUALIZING GRAPH-STRUCTURED RELATIONS FROM UNSTRUCTURED TEXT

(75) Inventors: Hany M. Hassan, Cairo (EG); Hala Mostafa, Cairo (EG)

(73) Assignee: International Business Machines Corporation, Armonk, NY (US)

( * ) Notice: Subject to any disclaimer, the term of this patent is extended or adjusted under 35 U.S.C. 154(b) by 478 days.

(21) Appl. No.: 11/557,527

(22) Filed: Nov. 8, 2006

(65) Prior Publication Data

US 2007/0124291 A1    May 31, 2007

(30) Foreign Application Priority Data

Nov. 29, 2005    (EP) .................................. 05111462

(51) Int. Cl.
  *G06F 7/00*    (2006.01)
(52) U.S. Cl. .................. 707/776; 707/777; 707/778
(58) Field of Classification Search ............... 707/1–10, 707/100, 776–778
See application file for complete search history.

(56) References Cited

U.S. PATENT DOCUMENTS

| | | | | |
|---|---|---|---|---|
| 2002/0023091 | A1* | 2/2002 | Silberberg et al. | 707/103 Y |
| 2003/0074352 | A1* | 4/2003 | Raboczi et al. | 707/4 |
| 2003/0126136 | A1* | 7/2003 | Omoigui | 707/10 |
| 2004/0030741 | A1* | 2/2004 | Wolton et al. | 709/202 |
| 2004/0083199 | A1* | 4/2004 | Govindugari et al. | 707/1 |

OTHER PUBLICATIONS

Rajarman "Mining semantic networks for knowledge discovery" Third IEEE International Conference on Data Mining, 2003. ICDM 2003, Nov. 19, 2003, Nov. 22, 2003 pp. 633.636, XP010673106 IEEE, Piscataway, NJ, US ISBN: 0-7695q978-4.*
"Rajaraman_2" "Knowledge discovery from texts: a concept frame graph approach" Proceedings of the Eleventh International Con Ference on Information and Knowledge Management. CIKM 2002, 2002, pp. 669-671, XP002408948 ACM, New York, N.Y, US ISBN; 1-58:113-492-4.*
Rajaraman K et al: "Mining semantic networks for knowledge discovery" Third IEEE International Conference on Data Mining, 2003. ICDM 2003, Nov. 19, 2003, Nov. 22, 2003 pp. 633.636, XP010673106 IEEE, Piscataway, NJ, US ISBN: 0-7695q978-4.*

(Continued)

*Primary Examiner*—Mohammad Ali
*Assistant Examiner*—John P Hocker
(74) *Attorney, Agent, or Firm*—Andrea Bauer; Hoffman Warnick LLC (57) ABSTRACT

The present invention is directed to a system, method and computer program for automatically extracting and mining relations and related entities from unstructured text. A method in accordance with an embodiment of the invention includes: extracting relations and related entities from unstructured text data, representing the extracted information into a graph, and manipulating the resulting graph to gain more insight into the information it contains. The extraction of relations and related entities is performed first by automatically inducting pattern and second by applying these induced patterns to unstructured text data. For each relation and entity, several features are extracted in order to build a graph whose nodes are entities and edges are relations.

16 Claims, 9 Drawing Sheets

OTHER PUBLICATIONS

PCT Written Opinion of the International Searching Authority, International Application No. PCT/EP2006/066457, International Filing Date Sep. 18, 2006.

PCT Notification of Transmittal of the International Search Report and the Written Opinion of the International Searching Authority, or the Declaration, International Application No. PCT/EP2006/066457, International Filing Date Sep. 18, 2006, Date Stamped Dec. 13, 2006.

Hassan et al., "Unsupervised Information Extraction Approach Using Graph Mutual Reinforcement", Proceedings of the 2006 Conference on Empirical Methods in Natural Language Processing (EMNLP 2006), pp. 501-508, Sydney, Jul. 2006.

Rajaraman et al., "Knowledge Discovery from Texts: A Concept Frame Graph Approach", CIKM '02, Nov. 4-9, 2002, McLean, Virginia, USA, pp. 669-671.

Rajaraman et al., "Mining Semantic Networks for Knowledge Discovery", Proceedings of the Third IEEE International Conference on Data Mining (ICDM '03).

* cited by examiner

METHOD AND SYSTEM FOR EXTRACTING AND VISUALIZING GRAPH-STRUCTURED RELATIONS FROM UNSTRUCTURED TEXT

FIELD OF THE INVENTION

The present invention relates to data processing and more particularly to a method, system and computer program for automatically extracting and visualizing relationally graph-structured data from unstructured text.

BACKGROUND OF THE INVENTION

Structured information may be defined as information whose intended meaning is explicitly represented in the structure or format of the data. The canonical example of structured information is a relational database. Unstructured information may be characterized as information whose meaning requires interpretation in order to approximate and extract the intended meaning. Examples include natural language documents, speech, audio, images, and video. In other words, unstructured data is any data residing unorganized outside a database. Unstructured data can be text, audio, video, or graphics.

Unstructured information represents the largest, most current, and fastest growing source of information available to the world of business or to governments. In some estimation, unstructured data represents 80% of all corporate information. High-value information in these huge amounts of data is difficult to discover. Unstructured information is not in a format adapted to search techniques. Searching for information in unstructured sources is impractical. First, data must be analyzed to detect and locate items of interest. The result must then be structured so that powerful search engines and database engines can efficiently find what is requested, when it is requested. The bridge from the unstructured world to the structured world is called Information Extraction (IE).

An Unstructured Information Management (UIM) application is generally a software system that analyzes a large volume of unstructured information (text, audio, video, images, etc.) to discover, organize and deliver relevant knowledge to a client or to an end-user. An example is an application that processes millions of medical documents and reports to discover critical interactions between drugs, side effects and a disease history. Another example is an application that processes millions of documents to discover key evidence indicating probable terrorist threats.

The management of unstructured data is recognized as one of the major unsolved problems in the information technology (IT) industry, the main reason being that the tools and techniques that can successful transform structured data into business intelligence and usable information simply don't work when applied to unstructured data.

An Unstructured Information Management (UIM) system deploys Information Extraction (IE) techniques on large volumes of unstructured information in order to discover, organize and deliver relevant knowledge to a client.

Information Extraction (IE) is an important unsolved problem of Natural Language Processing (NLP). One of the most important problems in information extraction is the extraction of entities from text documents and the extraction of relations among these entities. Examples of entities are "people", "organizations", and "locations". Examples of relations are "ORG-EMPLOY-EXECUTIVE", "ORG-LOCATION", and so on. For instance, the sentence "John Adams is the chief executive officer of XYZ Corporation" contains an "ORG-EMPLOY-EXECUTIVE" relation between the person "John Adams" and the organization "XYZ Corporation".

Various techniques have been used to extract relations between related entities. In supervised approaches, human experts manually identify entities and relation in given examples. A classifier is trained on these examples and is used later to identify relations and entities at runtime. Semi-supervised approaches use seed samples provided by an expert and try to automatically obtain more examples similar to the seed samples. Then, the seed samples and the obtained examples are used to train a classifier like in the supervised case.

Unstructured data comprises additional information other than entities and relations, such as the social network that represents the relations between the different entities, the period during which the entities have some relations, common factors shared between different entities, . . . , . This complex and rich information is difficult to acquire and very difficult to represent in an informative way.

The HITS ("Hypertext Induced Topic Selection") algorithm is an algorithm for rating, and therefore also ranking, Web pages. HITS uses two values for each page, the "authority value" and the "hub value". "Authority value" and "hub value" are defined in terms of one another in a mutual recursion. An authority value is computed as the sum of the scaled hub values that point to that page. A hub value is the sum of the scaled authority values of the pages it points to. Relevance of the linked pages is also considered in some implementations. The HITS algorithm takes profit of the following observation: when a page (hub) links to another page (authority), the former confers authority over the latter. The HITS approach is described in the publication entitled "Authoritative Sources in a Hyperlinked Environment", J Kleinberg, J. ACM (1999).

Extracting knowledge from unstructured data for some domains is a costly and unfeasible task since many hand crafted rules need to be generated to capture various information. Although it is very difficult operation to extract such knowledge for any given domain, it is more difficult to present and visualize data in a clear and useful way to the user. There are several issues associated with extracting and presenting information from unstructured data including, for example: the automatic discovery of patterns for extracting relations between entities from any unstructured data and in any domain (application); extraction of knowledge characterizing each entity and relation from the unstructured data (such as the time during which the relation was valid and the location of this entity at that time); definition of Multi-Layered relations (relations with various constraints and conditions, for example relations in a given time frame or relations between two persons in a given organization, . . . ); and visualization of the extracted knowledge (presenting the extracted knowledge in way that enables the user to ingest and digest this knowledge).

Most prior art only focus on the first issue which consists in extracting relations between entities from unstructured text. Work in this field can be found in the article entitled "Extracting Patterns and Relations from the World Wide Web", (by Sergy Brin—Computer Science Department Stanford University) published in "The proceedings of the 1998 International Workshop on the Web and Databases". This publication is directed to the extraction of authorship information as found in book descriptions on the World Wide Web. This publication is based on dual iterative pattern-relation extraction wherein a relation and pattern set is iteratively constructed. This approach has two major drawbacks: (1) using hand-crafted seed examples to extract more examples similar to these hand-crafted seed examples; and (2) employing a lexicon as main source for extracting information.

The article entitled "Snowball: Extracting Relations from Large Plain-Text collections" (Eugene Agichtein and Luis Gravano—Department of Computer Science Columbia University, 1214 Amsterdam Avenue NY), published in "Proceedings of the Fifth ACM International Conference on Digital Libraries", 2000 discloses an idea similar to the previous work by using seed examples to generate initial patterns and to iteratively obtain further patterns. Then ad-hoc measures are deployed to estimate the relevancy of the patterns that have been newly obtained. The major drawbacks of this approach are: (1) its dependency on seed examples leads to limited capability of generalization, (2) using hand-crafted examples leads to domain dependency, and (3) the estimation of the relevancy of patterns requests the deployment of ad-hoc measures.

US patent application publication 2004/0167907 entitled "Visualization of integrated structured data and extracted relational facts from free text" (Wakefield et al.) discloses a mechanism to extract simple relations from unstructured free text. However, this mechanism has several major drawbacks:

The mechanism to extract relations depends on a parse tree. This is a major drawback because accurate relations cannot be extracted.

It depends on human made rules. The mechanism is designed for certain problems and must be changed for each problem which is costly and not easy.

It deploys lexicons and other costly resources to extract information.

It is not general and cannot solve different problems in different domains.

It provides only simple relations and is not capable of providing highly detailed relations.

It is not fully automatic and needs a human intervention.

U.S. Pat. No. 6,505,197 entitled "System and method for automatically and iteratively mining related terms in a document through relations and patterns of occurrences" (Sundaresan et al.) discloses an automatic and iterative data mining system for identifying a set of related information on the World Wide Web that define a relationship, using the duality concept. Specifically, the mining system iteratively refines pairs of terms that are related in a specific way, and the patterns of their occurrences in web pages. The automatic mining system runs in an iterative fashion for continuously and incrementally refining the relates and their corresponding patterns. In one embodiment, the automatic mining system identifies relations in terms of the patterns of their occurrences in the web pages. The automatic mining system includes a relation identifier that derives new relations, and a pattern identifier that derives new patterns. The newly derived relations and patterns are stored in a database, which begins initially with small seed sets of relations and patterns that are continuously and iteratively broadened by the automatic mining system. However, this patent suffers from several drawbacks:

It depends on human work for providing seed patterns.

Resulting patterns are similar to the original seed patterns.

For each domain or application, new seed patterns have must be provided by an expert; this is tedious and costly process.

Extracting relations and patterns depends only on lexical (words) features which is very limited U.S. Pat. No. 6,606,625 entitled "Wrapper induction by hierarchical data analysis" (Muslea et al.) discloses an inductive algorithm generating extraction rules based on user-labeled training examples. The problem is that the labeling of the training data represents a serious bottleneck.

All previous solutions suffer from one or more of the following drawbacks:

They need hand-crafted rules or a large number of human annotated examples for composing the patterns used to extract the relations.

They are domain-specific and designed to solve very specific problems.

They depend on seed examples. The resulting patterns are not general and are very similar to the seed examples.

They are not language independent.

They provide only simple relations and are not capable of providing highly detailed relations.

They do not extract detailed features for each entity and relation.

They do not allow a sophisticated data mining on the extracted information.

They do not provide an efficient visualization for large amount of data.

SUMMARY OF THE INVENTION

It is an object of the present invention to automatically extract relations between entities from unstructured data, independently of the domain and language, without requiring any human intervention of any kind, and whatever the amount of data.

It is another object of the present invention to extract highly sophisticated relations and related entities, each extracted entity and relation being represented by a very rich structure of information.

It is a further object of the present invention to extract multi-layered relations between entities and to enable sophisticated data mining on the extracted information.

It is a further object of the present invention to visualize information in a clear and exploitable way that can help the user to ingest and digest a large amount of unstructured information.

The present invention is directed to a system, method and computer program for automatically extracting and mining relations and related entities from unstructured text. More particularly the present invention relates to a method for: extracting relations and related entities from unstructured text data; representing the extracted information into a graph; and manipulating the resulting graph to gain more insight into the information it contains.

The extraction of relations and related entities is performed first by automatically inducting pattern and second by applying these induced patterns to unstructured text data. For each relation and entity, several features are extracted in order to build a graph whose nodes are entities and edges are relations.

The present invention provides means for exploiting the graph and to derive other graphs focusing on relations within certain timeframes or involving certain features. This is done using respectively temporal graphs and feature-based graphs. Both methods basically query the content of the data structures associated with the nodes and edges of the graph.

The present invention offers visualization techniques for a better understanding of the information contained in the graph.

The present invention provides an effective solution for ingesting and digesting unstructured information and enables an efficient visualization of a large number of documents.

The foregoing, together with other objects, features, and advantages of this invention can be better appreciated with reference to the following specification, claims and drawings.

BRIEF DESCRIPTION OF THE DRAWINGS

The novel and inventive features believed characteristics of the invention are set forth in the appended claims. The invention itself, however, as well as a preferred mode of use, further objects and advantages thereof, will best be understood by reference to the following detailed description of an illustrative detailed embodiment when read in conjunction with the accompanying drawings.

DETAILED DESCRIPTION OF THE INVENTION

The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

An object of the present invention is to process unstructured text data to extract relations and related entities along with features for both. The result is a graph whose nodes and edges represent respectively entities and relations between these entities. When a large amount of information is extracted, the system also provides the ability to manipulate the graph in order to dynamically generate various graphs showing different aspects of the relations and/or entities.

Figure 1:
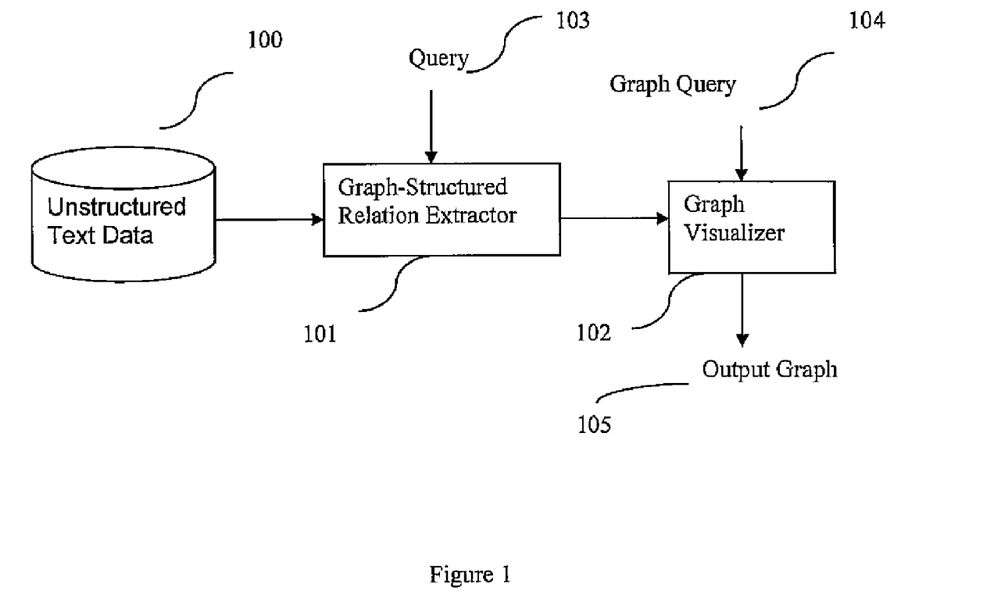
FIG. 1 shows a general overview of the system according to the present invention.

FIG. 1 shows a general view of the system according to the present invention. The system receives a user query 103 specifying a Named Entity (e.g., Person Name, Organization Name, or any other Named Entity in any domain). This Named Entity will be called herebelow "main entity".

A large amount of Unstructured Text Data 100 (e.g., World Wide Web) is provided to the Graph-Structured Relations Extractor 101, which extracts related entities, relations between the related entities, and various information characterizing the related entities and relations. The system builds a graph whose nodes represent the entities that are the most closely related to the main entity and edges represent the relations between the entities. A Graph Query 104 is applied to the graph to obtain a specific view of the data. The final output graph 105 is generated by the Graph Visualizer 102. This final output graph 105 represents the entities and their relations according to criteria specified in the query applied on the graph.

Figure 2:
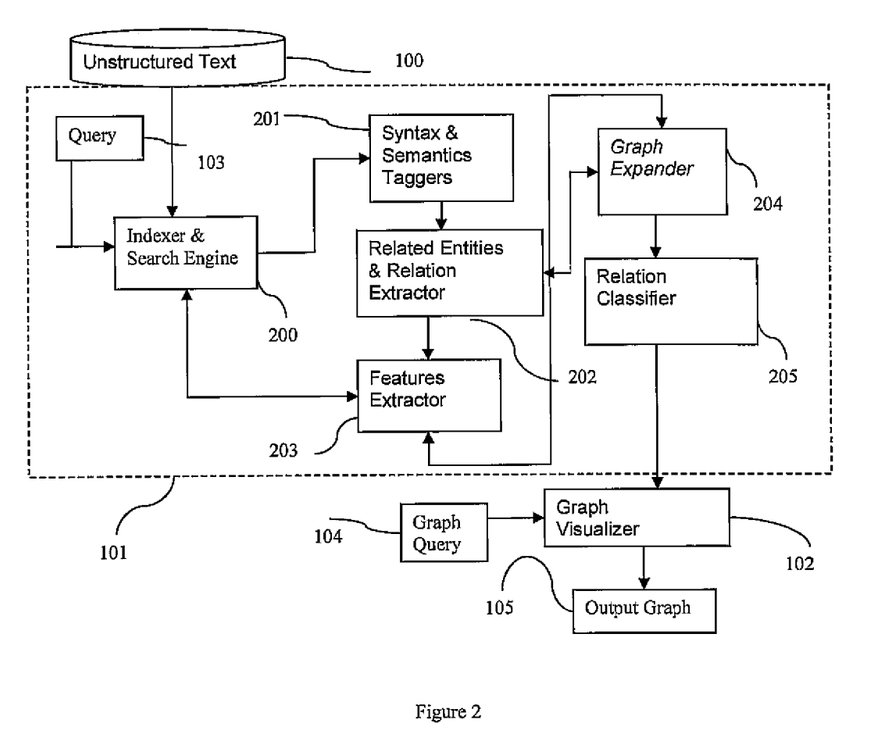
FIG. 2 is a detailed view of the Graph-Structured Relations Extractor according to the present invention

FIG. 2 is a detailed view of the Graph-Structured Relations Extractor 101 according to the present invention. The query 103 received from the user is transmitted to an Indexer and Search Engine 200 for a search in the Unstructured Text data 100 (on the Web for instance). The Unstructured Text data 100 includes a huge number of documents (i.e., various documents on the WEB such as WEB pages). The Search Engine 200 retrieves from the Unstructured Text Data 100, the documents containing the main entity specified in the query 103. Syntax and Semantics Taggers 201 are applied on the documents containing the main entity specified in the query 103 (the documents resulting from the Search Engine 200) to extract various named entities, lexical types and semantics of words. A Related Entities and Relation Extractor 202 extracts from the documents tagged in the previous step, the entities and relations that are strongly related to the main entity specified in the query 103. A Features Extractor 203 extracts information from the documents resulting from the search and containing the main entity specified in the query in order to characterize each entity and relation previously extracted in step 202. For example, for a specific entity, the persons who are close to this entity, the organizations, the locations, the temporal features, the words . . . which are closely related to this entity can be extracted.

A Graph Expander 204 repeats the previous steps, namely extracting relations and entities that are particularly related to the main entity specified in the query 103. This operation is done to expand the graph with additional related entities and relations. Many entities are related to the main entity specified in the query. Among those entities, some are particularly relevant and must be added to the graph. The problem is that we don't know how these relevant entities are related to each other and to other entities. This is the reason why the Graph Expander repeats the previous steps on the unstructured text (100) (and not only on the selected documents containing the main entity). Then, the Graph Expander 204 forms a graph based on the extracted entities and relations. The main entity specified in the query acts as the center point of the graph around which all other entities are connected.

A Relation Classifier 205 classifies the resulting relations according to a set of predefined categories according to the semantic meaning of the relations. For example relations such as "Leader", "President" and "Chairman" are classified as "EXECUTIVE". This step is optional and does not affect the output of the system.

The extracted entities and relations are represented in a graph. The Graph Expander 204 collects information from the unstructured text data and represents the information in a structure associated with each entity and relation. The graph is built in a way that facilitates the manipulation of the content. The graph is transmitted to the Graph Visualizer 102. This graph can be subject to a query 104 from the user specifying some criteria. In response to this query, the Graph Visualizer 102 generates a relatively simpler graph in output 105. This output graph 105 represents the entities and their relations according to the criteria specified in the query 104.

The system according to the preferred embodiment extracts from unstructured text, related entities and relations between these entities. Various taggers are applied to the text in order to attach different kinds of tags (e.g., a Named Entity tagger attaches to each word a tag representing its named entity category). The Relation and Related Entities Extractor 202 extracts the related entities along with a description of the relations between the entities. The Relation Classifier 203 classifies the extracted relation in a predefined set of relations.

The Relation and Related Entities Extractor 202 automatically extracts the related entities along with their relations. To extract relations and related entities, the Relation and Related Entities Extractor uses patterns with associated confidence measurements. The process of inducing (automatically acquiring) patterns is performed once and offline during the building of the system. Patterns are induced using a general framework that can be used for any entity and relation type. At run-time, the induced patterns are applied to the unstructured text to extract the entities and their associated relations.

Figure 3:
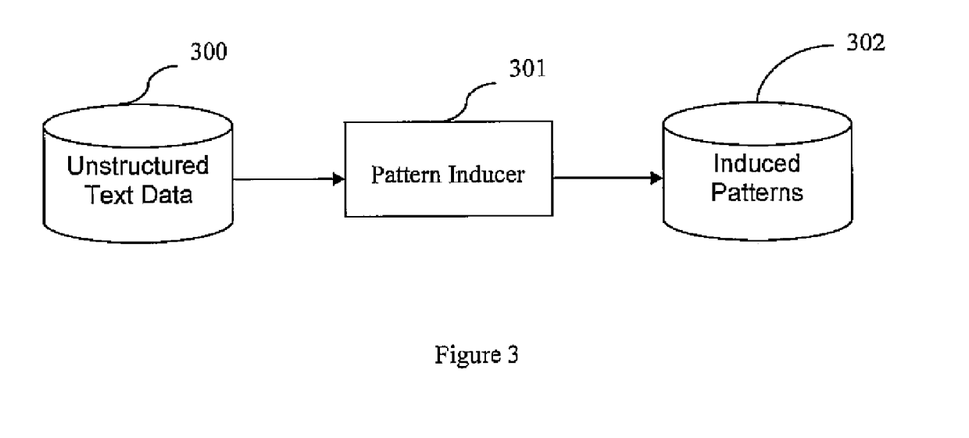
FIG. 3 is a block diagram of step of inducing patterns according to the present invention.

FIG. 3 is a general overview of the method of inducing patterns. Unstructured Text Data 300 is feed into the Pattern Inducer 301 which induces patterns 302 for then extracting entities and the relations between the entities (note: the unstructured text data 300 is the same as the unstructured text data 100). As mentioned above, the Pattern Inducer 301 according to the preferred embodiment operates on unstructured text data to induce patterns.

Figure 4:
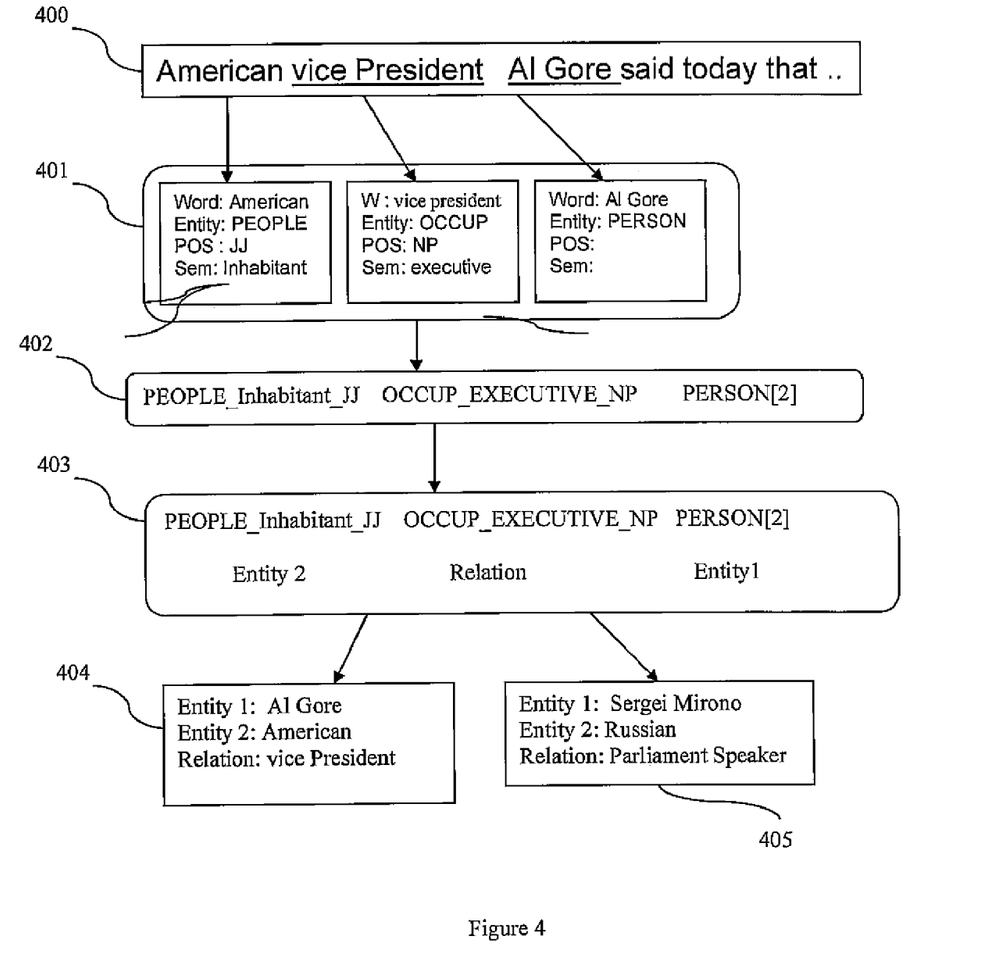
FIG. 4 is an example of template, pattern and tuples.

FIG. 4 describes the pattern structures and the processing that is performed on the unstructured text. For instance, the input text 400 "American vice President Al Gore said today that . . ." is tagged by means of various taggers (such as Part-Of-Speech (POS), semantics and Named Entity taggers). In other words, a tag is associated with each word in the sentence. The result is a set of multi-stream tags 401 representing various characteristics of the sentence 400.

Word: American
Entity: PEOPLE
Part-of-Speech: ADJECTIVE
Semantic: Inhabitant
Word: vice president
Entity: OCCUP
Part-of-Speech: NOUN-PHRASE
Semantic: executive
Word: Al Gore
Entity: PERSON
Part-of-Speech: NOUN
Semantic: NONE Different representations of the same sentence can be formed using combinations of different types of tags. The types of tags used in a given representation depend on the pattern the system will try to match.

A template is a sequence of generic tags. An example of template 402 is: PEOPLE_inhabitant OCUP_NP PERSON [2] VERB_PHRASE. This template is derived from the representation in 401 of the Named Entity tag, Part-of-Speech (POS) tag and semantic tag. All these tags are considered as a single tag. The choice of the pattern here is for illustration purpose only, any combination of tags, representations and tagging styles can be used.

A pattern is more specific than a template. A pattern specifies the role played by the tags (first entity, second entity, or relation). A pattern is obtained from a template as explained later. An example of pattern is represented in 403, in which the relation and each entity in the relation are identified.

This pattern indicates that the words with the tag PEOPLE_Inhabitant_JJ in the sentence represents the second entity (Entity 2) in the relation, while the words tagged PERSON[2] represent the first entity (Entity 1) in this relation. Finally, the words with the tag OCCUP_EXECUTIVE_NP represent the relation between the two previous entities.

A "tuple" is the result of the application of a pattern to unstructured text. In the above example, the result of applying the pattern to the raw text is the following tuple:
Entity 1: Al Gore
Entity 2: American
Relation: vice President Tuples 404, 405 show how different tuples can match a same pattern.

The method according to the present invention comprises the step of inducing a set of informative, high-confidence patterns. This set of patterns is applied to raw text during runtime in order to correctly identify the related entities and the relations between these entities.

Figure 5:
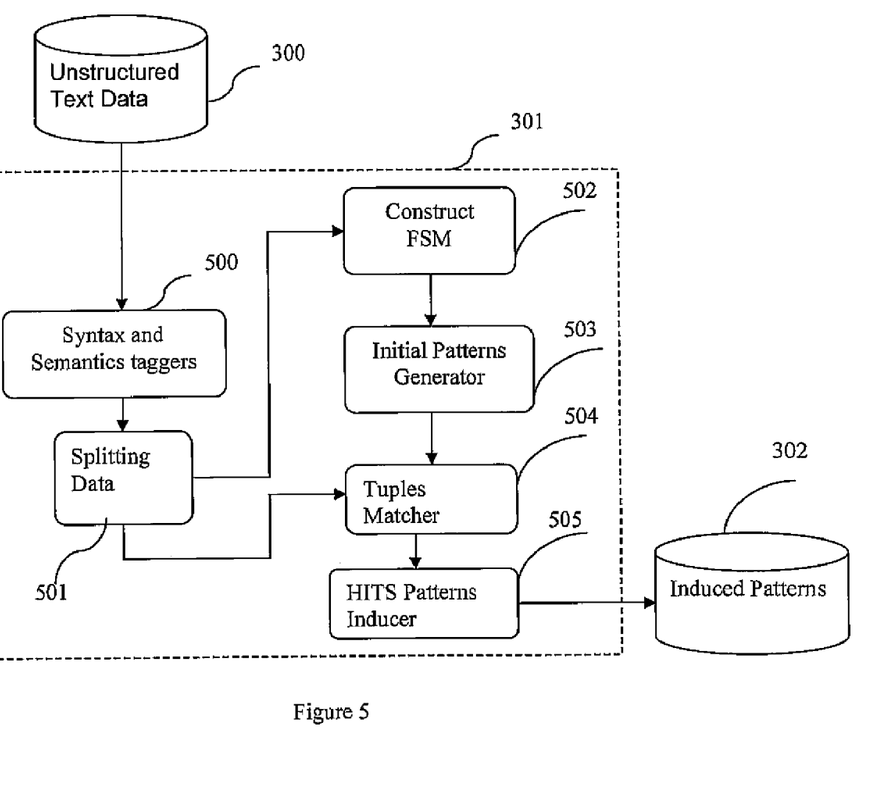
FIG. 5 shows the method for inducing patterns according to the present invention.

The Pattern Inducer 302 in FIG. 3 is further illustrated in detail in FIG. 5. The method for inducing patterns is carried out only once when the system is built. The method for inducing patterns comprises the following steps:

500: Various types of taggers such as POS Tagger, Named Entity Tagger and Semantic Tagger are applied on the Unstructured Text Data 300 (i.e., large text data or WEB data) by the Syntax and Semantics Taggers module.

501: The resulting data is divided into two parts: a small part and a larger one. This division is useful since only a small part of data is necessary to get an initial set of patterns while a large part of data is necessary to rank and verify these patterns using the induction process described later.

502: The small part of the data is used to construct a Finite State Machine 502 similar to the one shown in FIG. 6.

503: An Initial Patterns Generator is used to filter out unlikely templates which have a low probability in the Finite State Machine. Then, the Initial Patterns Generator uses the initial templates to generate an initial set of patterns. Each template in the set obtained previously, may generate several patterns by attaching different roles to the different parts of the template. If we consider now the following template:
PEOPLE NOUN_PHRASE PERSON PERSON LOCATION the following 3 patterns can be generated from this template:
PEOPLE:Entity1 NOUN_PHRASE:Relation PERSON:Entity2 PERSON_Entity2 LOCATION
PEOPLE:Entity1 NOUN_PHRASE:Relation PERSON PERSON LOCATION:Entity2
PEOPLE NOUN_PHRASE_Relation PERSON:Entity1PERSON:Entity1 LOCATION:Entity2

Thus the initial set of patterns is build by generating all possible patterns from each template in the initial set of templates.

504: A Tuples Matcher applies each pattern in the initial set of patterns to the unstructured data. The result consists of pairs (p,t) of patterns and tuples matching these patterns. Note that many of these pairs are wrong, i.e. they incorrectly identify the related entities and/or the relation.

Figure 6:
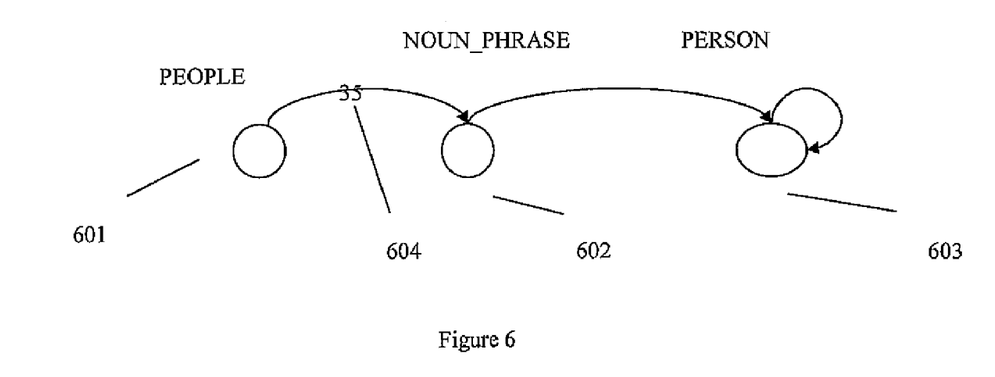
FIG. 6 is a Finite State Machine (FSM) for the initial representation of patterns according to the present invention.

FIG. 6 shows a the Finite State Machine for the pattern under consideration. The first state 601 represents the PEOPLE named entity. The second state 602 represents the NOUN_PHRASE. The third state 603 represents the repetitive PERSON named entity which can be represented by one or more names. The weight on the first arc 604 represents the probability of this states sequence.

Step 505 uses the following observation for automatically identifying the most informative patterns: patterns that match many tuples tend to be correct. Similarly, tuples that are matched by many patterns tend to be correct. The problem can therefore be seen as a hubs (tuples) and authorities (patterns) problem that can be solved using the HITS ("hypertext induced topic selection") algorithm. HITS is an algorithmic formulation of the notion of authority, based on a relationship between a set of relevant "authoritative pages" and a set of "hub pages". The HITS algorithm was originally used to determine the most authoritative web pages when considering a search query by analyzing the link structure of the WWW (Word Wide Web). The HITS algorithm takes benefit of the following observation: when a page (hub) links to another page (authority), the former confers authority over the latter.

The HITS Patterns Inducer operates as follows: Given a very large set of data D that contains a very large set of patterns P, we want to identify $\tilde{P}$, the set of patterns that match T, the set of the most correct tuples. In other words, we want to choose, among the large space of patterns in the data, the most informative, highest confidence patterns that can identify correct tuples. However, both $\tilde{P}$ and T are unknown.

The induction process is applied as follows: Each pattern $\tilde{p}$ in P is associated with a numerical Authority weight $A_P$ which expresses how many tuples match that pattern. Similarly, each tuple t in T has a numerical Hub weight $H_t$ which expresses how many patterns were matched by this tuple.

The weights are calculated iteratively as follows:

$$Ap = \sum_{t \approx p} H_t$$

$$H_t = \sum_{p \approx t} A_p$$

Then the weights are normalized such that:

$$\sum A_p^2 = 1$$

$$\sum H_t^2 = 1$$

Patterns with weight lower than predefined threshold are rejected.

The Authority weights are calculated such that in the first iteration HITS calculates the Authority weight by adding 1 for every tuple that matches the pattern, this summation is further weighted to favor shorter patterns. The weighted increment is calculated as follows:

$$\tilde{M} = 1 - \log\left(\frac{\text{length}(p)}{\text{MaxLength}}\right)$$

where $\tilde{M}$ is the length-based weight of the pattern and MaxLength is the length of the longest pattern. This modification gives better weight for shorter patterns. It results from this final step, a set comprising the most informative patterns, each pattern with an authority weight stored in the Induced Patterns 302 database. At runtime The Relation and Related Entities Extractor 202, as illustrated in FIG. 2, deploys the induced patterns 302 on the unstructured text data 300 in order to extract relations and related entities.

Figure 7:
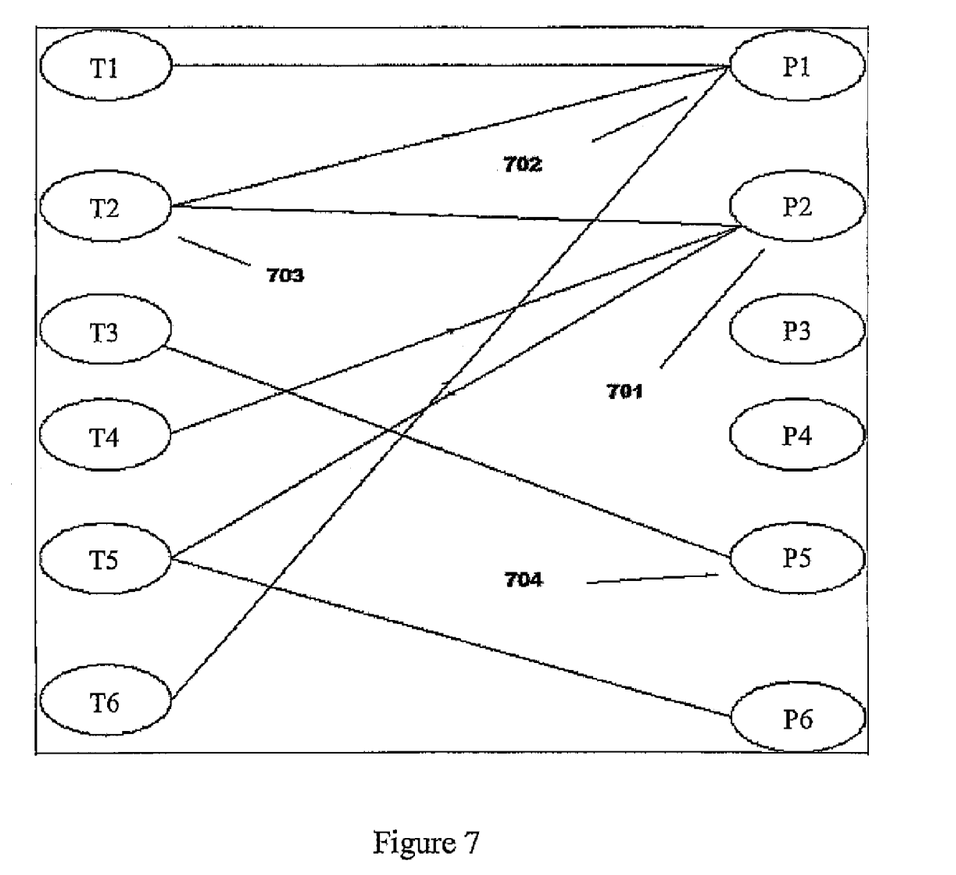
FIG. 7 shows a representation of patterns and tuples according to the HITS algorithm.

FIG. 7 shows a representation of patterns and tuples as a bipartite graph. Patterns 701 and 702 are connected to multiple tuples, similarly tuple 703 is connected to both patterns 701 and 702. This connectivity results in a mutual inference which increases the weight of both the patterns and the tuple. On the other hand pattern 704 has a single connection and thus a low weight.

As shown in FIG. 2, after being extracted by the extraction Relation and Related Entities Extractor 202, the related entities along with their relations are stored in a graph structure. The graph is created based on the main entity specified in the user query 103. The Features Extractor 203 extracts information from the unstructured text data to characterize each entity and relation. The result is an intricate graph whose nodes represent entities and edges represent relations. The graph is complex because rather than having simple labels, nodes and edges have data structures associated with them. In view of the volume of information contained in the graph, it is necessary to devise a method that indirectly allow the querying of node and edge data structures to dynamically generate variants of the original graph.

Each node is a structure comprising an entity and a vector based on features derived from the context in which the entity frequently occurs in the text. For example, for some person, the structure looks like this:

Entity Name: Person1
Associated Persons:

| Name1 | 0.43 |
| Name2 | 0.21 |
| ... | |

Associated Organizations:

| Org1 | 0.71 |
| Org2 | 0.12 |
| ... | |

Associated Locations:

| LOC1 | 0.50 |
| LOC2 | 0.24 |
| ... | |

Associated Bags of Words:

| Word1 | Word2 | word3 | 0.7 |

Associated Temporal

| Time1 | 0.12 |
| Time2 | 0.09 |
| ... | |

For an entity, the number associated with each feature is the probability of occurrence of this feature when considering all similar features appearing with this entity.

As seen above, the Relation Extractor 202 can identify which word in the raw text acts as relation. A structure for each edge/relation comprising the following fields is extracted, among others:

Relation class (e.g. Supervisor),
Strength of the relation (e.g. 0.85 meaning "strongly related to"),
Temporal information about the relation (e.g. the relation was during the 1980s).

The temporal information is used to construct temporal graphs taking into consideration the timeframe of a relation. The resulting graphs can indicate which entities were related at a given time. Such temporal graphs can show, for example, the kind of relations a person has had with different organizations and persons over his lifetime. The information contained in the node and edge structures aids to perform various operations on the graph.

To determine how strongly the entities are related, the system relies on the distance between features vectors associated with pair of nodes. The Graph Expander 204 uses these distances to decide whether it is necessary to expand the graph by adding certain entities or not. Entities which are close to the main entity are chosen to expand the graph.

The Graph Expansion is done by repeating the Relation Extraction and the Features Extraction steps on the entities chosen for expansion, which are the entities with small distance measure to the main entity. The graph expansion therefore results in several sub-graphs, each sub-graph being centered around one of the entities chosen for expansion. Various distance metrics can be used, among these are the Euclidian distance and the cosine distance. In a preferred embodiment, the cosine distance between two vectors is used.

The graph constructed in the previous step is very rich owing to the data stored in its nodes and edges. For this reason, it is advisable to offer some methods for representing the underlying data by means of different kinds of graphs. These graphs are obtained by querying the content of the node and edge data structures in different ways. The Graph Visualizer 102 deploys the Graph Query 104 to perform further data mining on the complicated graph to gain more insight into the data. The data are visualized with respect to certain features and characteristics in a simpler and more focused graph (Output Graph 105). Examples of three such graphs will be discussed. Other graphs can be obtained by changing the aforementioned query.

Figure 8:
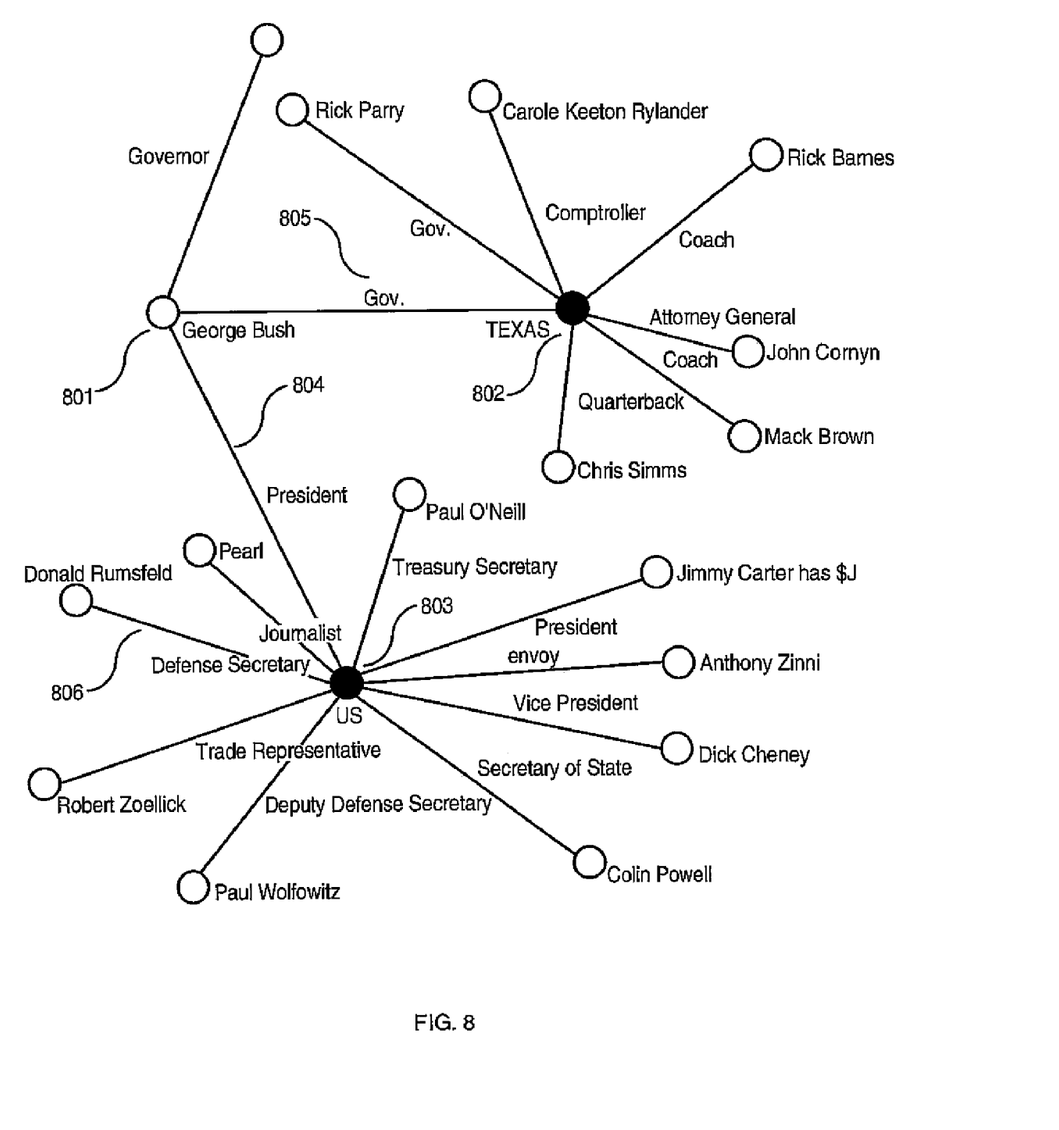
FIG. 8 is an example of Shallow Graph.

The simplest query on node and edge structures retrieves the name of entities and relations depicted by a graph. This results in a very "shallow" graph showing only the essential pieces of information. FIG. 8 is an example of such shallow Graph. Node 801 represents the main entity specified in the query, nodes 802 and 803 represent the entities which are the most strongly related to the main entity. Edge 804 represents the relation between node entity 801 and 803, while edge 805 represents the relation between node entity 801 and 802. Node 806 represents one of the many resulting entities in the graph which are related to the main query 801

A feature-based graph is built around the user query and is based on the feature vector of each node. It is possible to obtain other graphs using other queries based on different subsets of the feature vector. When deciding the strength of the relation between 2 entities, only the chosen subset of features is considered, hence the name "feature-based" graph. This kind of graphs answers questions like "which entities are associated with the same set of organizations as the main entity X?" or "which persons have similar hobbies to those of main entity X?". Since it is possible to apply a chosen distance metric to the smaller feature vectors under consideration, it is possible to obtain a degree of closeness between two entities with respect to the selected features. In other words, the closeness of two entities can be measured with regards to certain features only in order to provide more focus to data.

Because focusing on a subset of the feature vector can bring closer two nodes that are far apart in the original graph, it is possible to measure distances between nodes across sub-graph boundaries. This may reveal interesting relations that would otherwise be hard to spot in the original graph.

Figure 9:
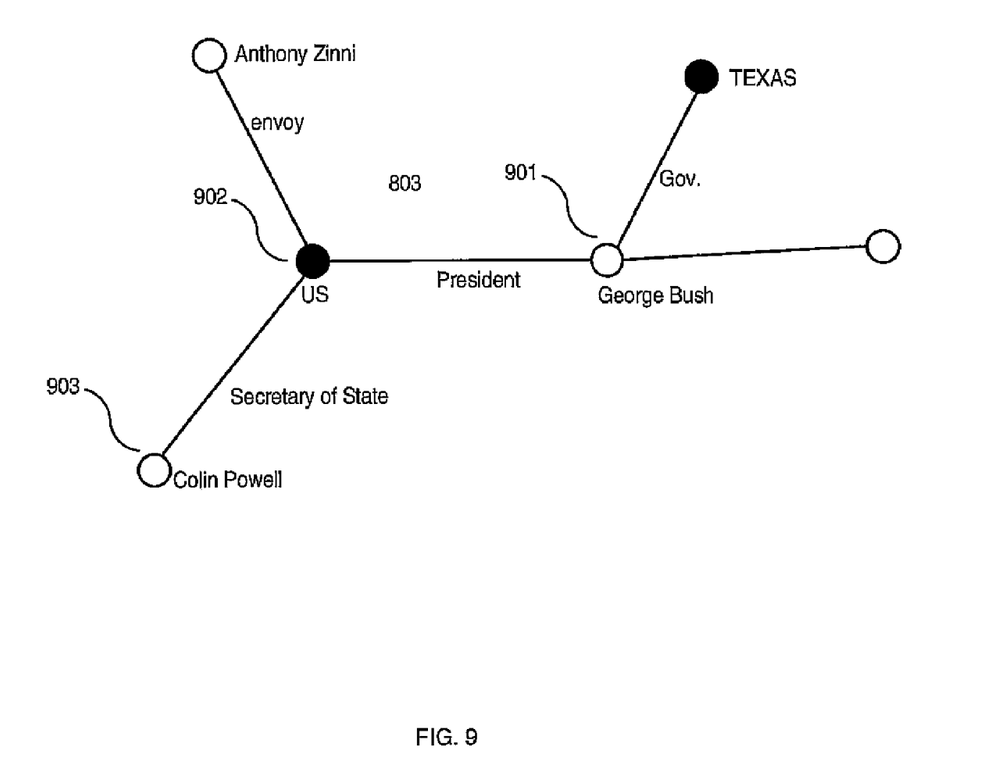
FIG. 9 is an example of Feature Based Graph.

FIG. 9 shows an example of such sub-graph, in which the entities related to "Middle East crisis" have been extracted from the graph shown in FIG. 8. The node 901 represents the main query while node 902 represents a main node in the graph. Node 903 is one of the nodes in FIG. 8 that satisfies the Feature-based criteria for this sub-graph.

As previously mentioned, the structure of each relation includes temporal information. This opens the door to yet another type of query that takes into consideration the timeframe of a relation. The resulting temporal graphs can tell which entities were related at a given time. By changing the time, graphs can differ in both the nodes they contain (because 2 entities may start/stop having a relation at a given time), and the weights of the edges (because the strength of a relation can vary over time). Such temporal graphs can show, for example, the different relations a person had with different organizations and persons over his life.

The Graph Visualizer 102 provides an enhanced visual representation of graphs in the following ways:

The node outline width indicates which node is central in a certain network.

The node color encodes node's named entity tag (e.g., Person, Organization). The intensity of the color indicates the extent to which this node is related to the central node currently chosen (e.g., a dark green node is an organization that is strongly related to X, and a light blue node is a location that is not so related to X).

The edge color reflects the class to which the relation belongs.

The edge thickness reflects the strength of the relation.

Brushing and linking are used to display feature-based graphs. In Information Visualization, brushing and linking are used to dynamically indicate related entities. Brushing and linking are particularly useful where several displays render the same underlying data in different forms. In this case, "brushing" a data item in one display causes the same item to be brushed in all other displays ("linked"). In the preferred embodiment, the user can choose the features that will be considered in constructing the feature-based graph. When brushing is active, a node's color intensity reflects its degree of belonging to the graph. For example, if the graph represents some person and we want to focus on other persons who are related to the a specific organization; the resulted new graph is a sub graph comprising people related to this organization only.

A Time Slider allows the user to move back and forth in time. As a result of this movement, temporal graphs are created. These temporal graphs reflect relations and related entities at a particular time. However, these graphs are not displayed for each slider movement. The color intensity of an entity's node can vary to reflect the changing strength of the relation between it and the main entity. Therefore, as the slider is moved, certain nodes fade out and others become more bright; the further away (in the past or future) a relation is from the currently chosen time, the more faded the related node looks. Entities that are related to the central one at the chosen time appear most bright.

Those skilled in the art will recognize that while a full structure of a data processing system suitable for operating the present invention is not herein described, its construction and operation may conform to current implementations known in the art. In particular, it is to be noted that the steps of the present method may be operated in a client-server mode from distributed systems connected through any type of computer network (public or private).

While the invention has been particularly shown and described with reference to a preferred embodiment, it will be understood that various changes in form and detail may be made therein without departing from the spirit, and scope of the invention.

What is claimed is:

1. A method for automatically extracting and mining relations and related entities from unstructured text, comprising:
    Receiving a query specifying a main entity; and
    Extracting, using a computer processing system, from unstructured text relations and related entities related to the main entity specified in the query, the extracting further comprising:
        Searching and selecting in the unstructured text, documents containing the main entity;
        Attaching to each word of the selected documents, at least one tag, each tag being of a different type;
        extracting relations and related entities by applying patterns to the tagged documents, wherein the patterns are induced from unstructured text, the inducing comprising:
            attaching to each word of an unstructured text, at least one tag of a different type;
            defining at least one template, each template being based on a sequence of tags;
            and Generating from each template, at least one pattern, each pattern specifying a role for each tag in the template;
        Extracting from the selected documents features characterizing each entity and relation; and
        building a graph based on the extracted features, whose nodes represent the entities related to the specified main entity and whose edges represent the relations between the entities, wherein building a graph based on the extracted features further comprises expanding the graph based on distances between nodes, the expanding further comprising selecting at least one expanded entity, close to the main entity, and extracting from the unstructured text, relations and related entities related to each expanded entity;
        wherein extracting features characterizing each relation from the selected documents further comprises associating each relation with a relation class, a relation strength, and temporal information, and wherein building the graph further comprises indicating on the graph which of the entities are related at a given time based on the temporal information for each relation.

2. The method according to claim 1, further comprising: manipulating the graph in order to gain more insight into information it contains.

3. The method according to claim 1, wherein attaching to each word of the selected documents, at least one tag, each tag being of a different type, further comprises:
    applying syntax and semantic taggers on selected documents in order to extract named entities, lexical types, and semantics of words.

4. The method according claim 1, wherein manipulating the resulting graph in order to gain more insight into information it contains, further comprises:
    receiving a graph query to obtain a specific representation of the related entities and relations according to certain criteria; and
    in response to the graph query, generating an output graph representing the entities and their relations according to the criteria specified in the graph query.

5. The method according to claim 4, wherein the criteria are temporal criteria or are conditions and/or constrains related to at least one feature associated with the relations and related entities.

6. The method according to claim 1, wherein building a graph based on the extracted features, further comprises
    associating each node representing an entity, with a vector based on the value of the features characterizing the relations and related entities.

7. The method according to claim 1, wherein the at least one feature characterizing an entity is derived from the context in which the entity frequently occurs in the selected documents containing the main entity.

8. The method according to claim 1, wherein the value associated with a feature characterizing an entity is based on a probability of occurrence of the feature with the associated entity.

9. The method according to claim 1, wherein building a graph based on the extracted features further comprises:
    classifying relations in a predefined category according to a semantic meaning of the relation.

10. The method according to claim 1, wherein a tag is a part of speech tag, a named entity tag, a semantic tag, or a tag of any other type.

11. The method according to claim 1, wherein defining at least one template further comprises:
    selecting an initial set of templates; and
    filtering out unlikely templates from the initial set of templates.

12. The method according to claim 11, wherein generating from each template, at least one pattern, further comprises:
    generating an initial set of patterns from the initial set of templates;
    applying each pattern in the initial set of patterns to the unstructured text in order to obtain for each pattern, as many tuples as possible matching the pattern, a tuple being the result of the application of a pattern to unstructured text; and
    identifying most informative patterns.

13. The method according to claim 12, wherein identifying most informative patterns further comprises:
    running a Hypertext Induced Topic Selection (HITS) algorithm.

14. The method according to claim 1, wherein each pattern specifies for each tag in the template whether the tag is a first entity, a second entity, or a relation.

15. A system for automatically extracting and mining relations and related entities from unstructured text, comprising:
    a computer processing system, including:
        a system for receiving a query specifying a main entity; and
        a system for extracting from unstructured text relations and related entities related to the main entity specified in the query, the system for extracting further comprising:
            a system for searching and selecting in the unstructured text, documents containing the main entity;
            a system for attaching to each word of the selected documents, at least one tag, each tag being of a different type;
            a system for extracting relations and related entities by applying patterns to the tagged documents, the system for extracting relations and related entities comprising a system for inducing the patterns from unstructured text, the inducing comprising:
                attaching to each word of an unstructured text, at least one tag of a different type;
                defining at least one template, each template being based on a sequence of tags; and generating from each template, at least one pattern, each pattern specifying a role for each tag in the template;

a system for extracting from the selected documents features characterizing each entity and relation; and a system for building a graph based on the extracted features, whose nodes represent the entities related to the specified main entity and whose edges represent the relations between the entities, wherein the system for building a graph based on the extracted features further comprises a system for expanding the graph based on distances between nodes, the expanding of the graph based on distances between nodes further comprising selecting at least one expanded entity, close to the main entity, and extracting from the unstructured text, relations and related entities related to each expanded entity;

wherein the system for extracting features characterizing each relation from the selected documents further is configured to associate each relation with a relation class, a relation strength, and temporal information, and wherein the system for building the graph is configured to indicate on the graph which of the entities are related at a given time based on the temporal information for each relation.

16. A computer program stored on a computer readable medium for automatically extracting and mining relations and related entities from unstructured text, when the computer program is executed on a computer, the computer program comprising program code for:

receiving a query specifying a main entity; and extracting from unstructured text relations and related entities related to the main entity specified in the query, the extracting further comprising:

searching and selecting in the unstructured text, documents containing the main entity;

attaching to each word of the selected documents, at least one tag, each tag being of a different type;

extracting relations and related entities by applying patterns to the tagged documents, wherein the patterns are induced from unstructured text, the inducing comprising: attaching to each word of an unstructured text, at least one tag of a different type; defining at least one template, each template being based on a sequence of tags; and generating from each template, at least one pattern, each pattern specifying a role for each tag in the template;

extracting from the selected documents features characterizing each entity and relation; and building a graph based on the extracted features, whose nodes represent the entities related to the specified main entity and whose edges represent the relations between the entities, wherein building a graph based on the extracted features further comprises expanding the graph based on distances between nodes, the expanding further comprising selecting at least one expanded entity, close to the main entity, and extracting from the unstructured text, relations and related entities related to each expanded entity;

wherein extracting features characterizing each relation from the selected documents further comprises associating each relation with a relation class, a relation strength, and temporal information, and wherein building the graph further comprises indicating on the graph which of the entities are related at a given time based on the temporal information for each relation.

* * * * *